(12) United States Patent
Kuybeda et al.

(10) Patent No.: US 10,819,919 B2
(45) Date of Patent: Oct. 27, 2020

(54) SHUTTERLESS FAR INFRARED (FIR) CAMERA FOR AUTOMOTIVE SAFETY AND DRIVING SYSTEMS

(71) Applicant: Adasky, Ltd., Yokneam Illit (IL)

(72) Inventors: Oleg Kuybeda, Boyds, MD (US); Eyal Madar, Haifa (IL); Sharon Ulman, Kfar Yehoshua (IL); Avi Katz, Zichron Yaakov (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 15/989,779

(22) Filed: May 25, 2018

(65) Prior Publication Data
US 2018/0352174 A1 Dec. 6, 2018

Related U.S. Application Data

(60) Provisional application No. 62/515,200, filed on Jun. 5, 2017, provisional application No. 62/526,733, filed
(Continued)

(51) Int. Cl.
*H04N 5/33* (2006.01)
*B60R 1/00* (2006.01)
(Continued)

(52) U.S. Cl.
CPC .............. *H04N 5/33* (2013.01); *B60R 1/00* (2013.01); *G05D 1/0242* (2013.01); *G06K 9/00805* (2013.01); *G06K 9/00825* (2013.01); *G06K 9/03* (2013.01); *G06K 9/2018* (2013.01); *G06K 9/4642* (2013.01); *H04N 5/23229* (2013.01);
(Continued)

(58) Field of Classification Search
CPC .... H04N 5/33; H04N 5/2176; H04N 5/23229; H04N 5/243; H04N 5/3651; G06T 2207/10048; G06T 5/002; G06T 5/003; G06T 7/0002; G06T 7/20; G01J 2005/068; G01J 5/06; G05D 1/0242; G05D 2201/0213
See application file for complete search history.

(56) References Cited

U.S. PATENT DOCUMENTS 5,053,870 A  10/1991  Ito et al.
5,323,334 A   6/1994  Meyers et al.
(Continued)

OTHER PUBLICATIONS

International Search Report and Written Opinion of International Searching Authority for PCT/US2018/034620, ISA/RU, Moscow, Russia, dated Aug. 27, 2018.
(Continued)

*Primary Examiner* — Chikaodili E Anyikire
(74) *Attorney, Agent, or Firm* — M&B IP Analysts, LLC

(57) ABSTRACT

A shutterless far-infrared (FIR) camera for advanced driver assistance systems, including at least one optical unit including at least one lens; an FIR sensor coupled to the optical unit and configured to capture FIR images; and an integrated circuit (IC) configured to process the captured FIR images to output an enhanced thermal video stream, wherein the IC further includes: a processing circuitry; and a memory containing instructions that, when executed by the processing circuitry, configure the processing circuitry to perform image corrections including at least a shutterless correction.

30 Claims, 6 Drawing Sheets

Related U.S. Application Data on Jun. 29, 2017, provisional application No. 62/543,108, filed on Aug. 9, 2017, provisional application No. 62/552,620, filed on Aug. 31, 2017.

(51) Int. Cl.

| | | |
|---|---|---|
| *G05D 1/02* | (2020.01) | |
| *H04N 5/357* | (2011.01) | |
| *H04N 9/73* | (2006.01) | |
| *H04N 5/243* | (2006.01) | |
| *H04N 5/232* | (2006.01) | |
| *H04N 9/68* | (2006.01) | |
| *G06K 9/00* | (2006.01) | |
| *G06K 9/46* | (2006.01) | |
| *G06K 9/03* | (2006.01) | |
| *H04N 5/367* | (2011.01) | |
| *H04N 5/365* | (2011.01) | |
| *G06K 9/20* | (2006.01) | |

(52) U.S. Cl.
CPC ........... *H04N 5/243* (2013.01); *H04N 5/3577* (2013.01); *H04N 5/367* (2013.01); *H04N 5/3651* (2013.01); *H04N 9/68* (2013.01); *H04N 9/735* (2013.01); *B60R 2300/108* (2013.01); *B60R 2300/30* (2013.01); *G05D 2201/0213* (2013.01)

(56) References Cited

U.S. PATENT DOCUMENTS

| | | | |
|---|---|---|---|
| 5,414,439 A | 5/1995 | Groves et al. | |
| 6,759,949 B2 | 7/2004 | Miyahara | |
| 7,199,366 B2 * | 4/2007 | Hahn | G02B 23/12 |
| | | | 250/330 |
| 7,683,321 B1 | 3/2010 | King et al. | |
| 7,786,898 B2 | 8/2010 | Stein et al. | |
| 8,067,735 B2 | 11/2011 | King et al. | |
| 8,208,026 B2 | 6/2012 | Högasten et al. | |
| 8,378,290 B1 | 2/2013 | Speake et al. | |
| 8,384,783 B2 | 2/2013 | Strandemar et al. | |
| 8,503,821 B2 | 8/2013 | Hogasten | |
| 8,562,776 B2 | 10/2013 | Liberman et al. | |
| 8,743,207 B2 | 6/2014 | Boulanger et al. | |
| 8,981,966 B2 | 3/2015 | Stein et al. | |
| 9,143,703 B2 | 9/2015 | Boulanger et al. | |
| 9,251,595 B2 | 2/2016 | Bailey et al. | |
| 9,292,909 B2 | 3/2016 | Högasten et al. | |
| 9,508,124 B2 | 11/2016 | Bailey et al. | |
| 9,565,371 B2 | 2/2017 | Johansson et al. | |
| 9,635,220 B2 | 4/2017 | Foi et al. | |
| 9,681,066 B2 | 6/2017 | Strandemar | |
| 2003/0007074 A1 | 1/2003 | Nagaoka et al. | |
| 2006/0279632 A1 | 12/2006 | Anderson | |
| 2008/0197284 A1 | 8/2008 | Ebenstein et al. | |
| 2010/0111412 A1 | 5/2010 | Högasten et al. | |
| 2012/0312976 A1 * | 12/2012 | Boulanger | H04N 5/33 |
| | | | 250/252.1 |
| 2012/0320217 A1 | 12/2012 | Högasten | |
| 2012/0321212 A1 | 12/2012 | Högasten et al. | |
| 2013/0218500 A1 | 8/2013 | Durand et al. | |
| 2014/0015921 A1 | 1/2014 | Foi et al. | |
| 2014/0016879 A1 | 1/2014 | Högasten et al. | |
| 2014/0037225 A1 | 2/2014 | Högasten et al. | |
| 2014/0092257 A1 * | 4/2014 | Hogasten | H04N 5/33 |
| | | | 348/164 |
| 2014/0198218 A1 | 7/2014 | Afrooze et al. | |
| 2014/0270563 A1 | 9/2014 | Bailey et al. | |
| 2014/0354825 A1 | 12/2014 | Johansson et al. | |
| 2014/0355904 A1 | 12/2014 | Olsson | |
| 2015/0009335 A1 * | 1/2015 | Strandemar | H04N 5/33 |
| | | | 348/164 |
| 2015/0226613 A1 * | 8/2015 | Bauer | G01J 5/52 |
| | | | 250/349 |
| 2015/0312488 A1 | 10/2015 | Kostrzewa et al. | |
| 2015/0332441 A1 * | 11/2015 | Hogasten | G06T 5/003 |
| | | | 348/148 |
| 2015/0350567 A1 * | 12/2015 | Parrish | H04N 5/33 |
| | | | 348/164 |
| 2015/0355026 A1 | 12/2015 | Iguchi et al. | |
| 2016/0104048 A1 | 4/2016 | Stein et al. | |
| 2016/0203694 A1 | 7/2016 | Högasten et al. | |
| 2017/0103279 A1 | 4/2017 | Hong et al. | |
| 2017/0150070 A1 | 5/2017 | Johansson et al. | |
| 2017/0262995 A1 | 9/2017 | Li et al. | |

OTHER PUBLICATIONS

International Search Report and Written Opinion of International Searching Authority for PCT/US2018/039987, ISA/RU, Moscow, Russia, dated Oct. 16, 2018.

Choi, et. al., "Convolutional Recurrent Neural Networks for Music Classification", FAST IMPACt EPSRC Grant EP/L019981/1 and the European Commission H2020 Research and Innovation Grant AudioCommons, arXiv: 1609.04243, vol. 1, Sep. 14, 2016.

Liang, et. al., "Recurrent Convolutional Neural Network for Object Recognition", IEEE: State Key Laboratory of Intelligent Technology and Systems, TNlist, CBICR, 978-1-4673-6964-0/15, 2015, pp. 3367-3375.

* cited by examiner

SHUTTERLESS FAR INFRARED (FIR) CAMERA FOR AUTOMOTIVE SAFETY AND DRIVING SYSTEMS

CROSS-REFERENCE TO RELATED APPLICATIONS

This application claims the benefit of U.S. Provisional Application No. 62/515,200 filed on Jun. 5, 2017; U.S. Provisional Application No. 62/526,733 filed on Jun. 29, 2017; U.S. Provisional Application No. 62/543,108 filed on Aug. 9, 2017; and U.S. Provisional Application No. 62/552,620 filed on Aug. 31, 2017. All of the applications referenced above are hereby incorporated by reference.

TECHNICAL FIELD

The present disclosure relates generally to automotive safety systems and, more specifically, to shutterless far-infrared (FIR) cameras that can be efficiently utilized by such systems.

BACKGROUND

Thermal infrared (IR) cameras capture image wavelengths in the range of seven and half to fourteen micrometers. A typical IR camera uses an infrared sensor (or detector) to detect infrared energy that is guided to the sensor through the camera's lens. IR cameras can be utilized for a variety of imaging applications including, but not limited to, passive motion detection, night vision, thermal mapping, health care, building inspection, surveillance, and the like. Recently, an attempt has been made in the IR industry to integrate IR cameras in advanced driver assistance systems and autonomous vehicle systems.

The application, and hence the type of camera, may depend on the infrared spectrum. The infrared spectrum lies outside the visible light range and consists of a near infrared section (NIR), with wavelengths of 0.75-1.0 micrometers (μm); a short infrared section (SWIR) with wavelengths of 1-3.0 micrometers (μm); a mid-Infrared section (MIR), with wavelengths of 3.0-5.0 μm; and a far-infrared (FIR) section, with wavelengths of 7.0-14. μm.

One type of FIR sensor is an uncooled sensor having a small form factor. Such sensors can typically be mass-produced using low-cost technology. In a typical arrangement, an uncooled sensor does not require a cryocooler for proper operation, but does require a shutter for frequent calibration. A shutter is a mechanical element placed between the lens and the FIR sensor for alternately blocking and exposing the sensor to infrared wavelengths. Generally, a shutter includes a flat-bladed flag, a sleeve, and an arm that connects the sleeve to the flag. The flag opens and closes at predefined time intervals.

The shutter is used during a flat-field correction (FFC) process. In a FFC process, the shutter presents a uniform temperature source to the FIR sensor. While imaging the flat-field source, the camera updates the offset correction coefficients, resulting in a more uniform image after the process is completed. The duration of the FCC process is a few hundred milliseconds, during which the image captured just prior to the shutter blocking the field of view is frozen until the FFC process ends, when the shutter is reopened. This process must occur every few minutes.

While using a shutter may improve the quality and accuracy of the thermal image captured by an FIR sensor, having a black period of hundreds of milliseconds is not acceptable in certain applications. For example, using a shutter-based FIR camera in advanced driver assistance systems and autonomous vehicle systems can pose a high risk, as the camera must frequently shut off for the length of the FFC. In addition, shutters include moving parts that wear out over time. This may cause a camera malfunction during driving as well as shorten the life time of the camera.

The FIR camera designed for advanced driver assistance systems and autonomous vehicle systems should meet additional constraints other than safety. Such constraints include a small form factor, accurate and low latency image processing, and low-power consumption. As such, currently available FIR cameras, and in particular shutter-based FIR cameras, are not well adapted for such automotive applications.

It would therefore be advantageous to provide a shutterless FIR camera for advanced driver assistance systems and autonomous vehicles systems that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a shutterless far-infrared (FIR) camera for advanced driver assistance systems, including: at least one optical unit including at least one lens; an FIR sensor coupled to the optical unit and configured to capture FIR images; and an integrated circuit (IC) configured to process the captured FIR images to output an enhanced thermal video stream, wherein the IC further includes: a processing circuitry; and a memory containing instructions that, when executed by the processing circuitry, configure the processing circuitry to perform image corrections including at least a shutterless correction.

Certain embodiments disclosed herein also include an electronic circuit integrated in a shutterless far-infrared (FIR) camera and configured to process FIR images, including: a processing circuitry; and a memory containing instructions that, when executed by the processing circuitry, configure the processing circuitry to perform image corrections, including at least a shutterless correction on the FIR images to output an enhanced thermal video stream.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
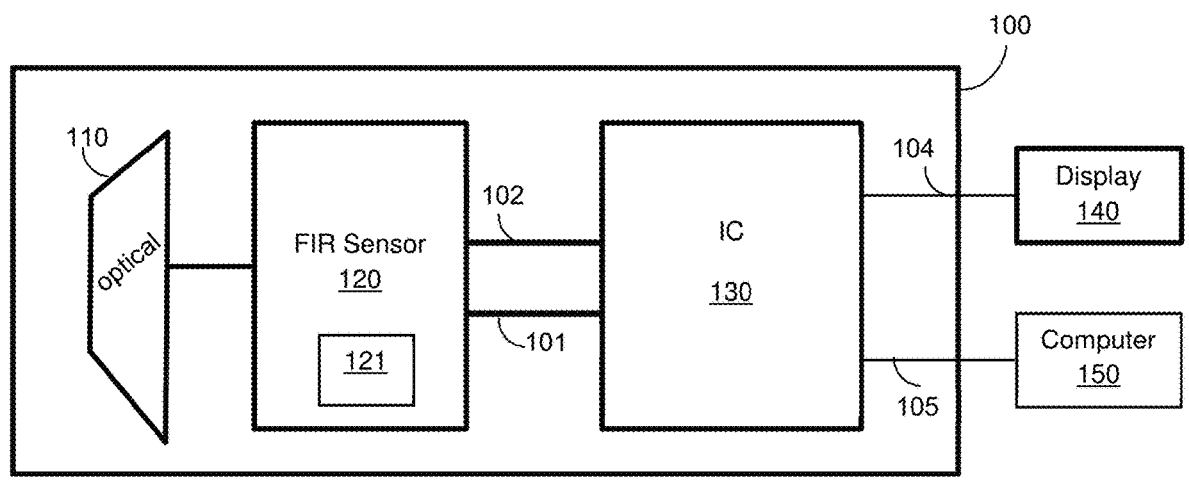
FIG. 1 is a block diagram of an FIR camera structured according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a far-infrared (FIR) camera that does not include a shutter or any other moving part that blocks the field of view of the camera during operation. Thus, the FIR camera is a shutter-less camera. In an embodiment, the FIR camera is optimized to operate or be integrated in advanced driver assistance systems and autonomous vehicles systems (collectively referred to hereinafter as AVS systems).

FIG. 1 is an example block diagram of an FIR camera 100 implemented according to an embodiment. The FIR camera 100 includes an optical unit 110 and an FIR sensor 120 coupled to an integrated circuit (IC) 130. The output of the FIR camera 100 is a video stream of thermal images (thermal video stream) captured by the FIR sensor 120 and processed by the IC 130.

In an embodiment, two thermal video streams are output by the FIR camera 100. A first stream 104 includes thermal images captured by the FIR sensor 120 and processed by the IC 130 for the shutterless correction and image enhancement. In an example embodiment, the first thermal video stream 104 is an 8-bit grayscale video stream. The first thermal video stream 104 is fed to a display 140 which may be a screen or a dashboard of a vehicle. In a further embodiment, multiple thermal video streams are output by the FIR camera. The output streams may include results from images received from non-FIR sensors, e.g., visible wavelength, CCD or CMOS sensors.

A second stream 105 includes thermal images captured by the FIR sensor 120 and processed by the IC 130 for at least shutterless correction. In an example embodiment, the second thermal video stream 105 is a 14-bit data stream. The second stream 105 is fed to a computer 150 for computer vision processing. Specifically, the computer 150 may be configured to execute various computer vision algorithms related to AVS and other autonomous systems and applications. The algorithms may include, but are not limited to, detection of objects, obstacles, or hazards on a road. For example, the processed thermal video stream as output by the FIR camera 100 can be utilized for the detection of vehicles, pedestrians, animals, two-wheelers, black-ice spots, litter, debris, potholes, gully covers, curbs and so on. In an embodiment, the computer 150 may be an onboard vehicle computer or a dedicated computer installed in the vehicle (not shown). In some example embodiments, the computer may be a virtual or physical computing machine operable in a cloud computing platform (not shown).

As will be discussed below, according to some embodiments, the processing performed by the IC 130 is configured to enhance the quality of the captured thermal images to allow for accurate and fast detection of objects, obstacles and hazards on the road. The processing by the IC 130 ensures passive detection of objects during day and night lighting conditions and at all weather conditions. To this end, the IC 130 is configured to perform one or more image processing tasks. Such tasks include, but are not limited to, shutterless correction, sunburn protection, bad pixel replacement, near field correction, temporal denoising, spatial denoising, edge enhancement, automatic gain control, local contrast, enhancement, and brightness and polarity adjustment. In an embodiment, these tasks are performed in a pipeline manner where some or all the tasks may be utilized to process a FIR image (frame), thus ensuring low latency processing.

An important image processing task performed by the IC 130 is the shutterless correction of FIR images captured by the FIR sensor 120. As demonstrated in FIG. 1, the FIR camera 100 does not include any shutter (or any moving part that can be viewed as shutter). The shutterless correction executed by the IC 130 allows the performance of a flat-field correction without any shutter. That is, shutterless correction allows for a uniform FIR image.

Figure 5:
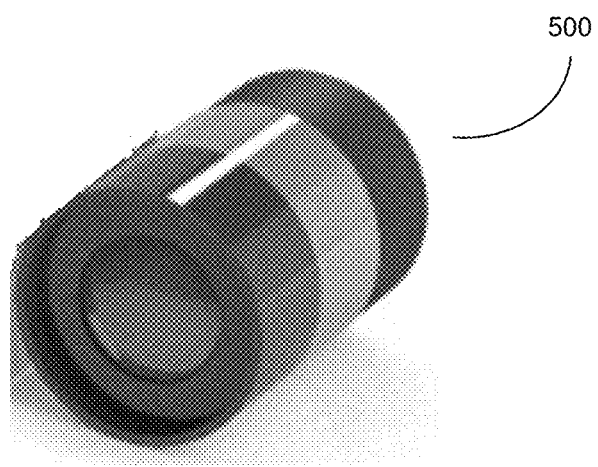
FIG. 5 is an example form factor of the FIR camera designed according to embodiment.

It should be appreciated that the shutterless FIR camera 100 is mechanically reliable and meets safety standards required for AVS systems. Further, not using a shutter allows designing an FIR camera 100 with a small form factor as there is no need to include moving parts in the design. An example form factor of the FIR camera 100 is shown in FIG. 5.

In an embodiment, the optical unit 110 includes one or more lens elements, each of which having a predetermined field of view (FOV). In an embodiment, the lens elements are chalcogenide. The lens may be protected by a protective window (not show in FIG. 1). Further, to prevent icing of the optical unit 110, it may be covered by a heating means (not shown in FIG. 1). The heating means may include a wire or a coil.

In an embodiment, the FIR camera 100 may include multiple optical units 110. Each optical unit 110 may be used independently or may be used in conjunction with one or more other optical units 110. For example, a single FIR sensor 120 may be connected to two or more optical units 110. Further, in an embodiment, multiple FIR sensors 120 may be connected to a single IC 130. The multiple optical units 110 and/or multiple FIR sensors 120 may be used in tandem to capture and create a resulting image with a higher final resolution than a single optical unit 110 or FIR sensor 120 may otherwise provide. As a non-limiting example, two VGA (640 pixels×480 pixels) sized FIR sensors 120 may be used to capture a single 1280 pixels×480 pixels FIR image. The IC 130 may be configured to automatically stitch two adjacent images together and may apply all of the corrections discussed herein to the final composite image. Alternatively, each individual image may be first corrected, and then stitched together. In a further embodiment, the images are not stitched, but rather concatenated horizontally or vertically when output to a display or to a computer. In yet a further embodiment, the multiple optical units 110 or FIR sensors 120 may be used for stereo vision applications, or to provide multiple view angles of a scene.

In yet a further embodiment, multiple image streams are received and processed by the FIR camera 100. Such embodiments may include creating an output stream that is a fusion of the multiple video streams, including different imaging modalities e.g., a fusion of FIR images with a visible-spectrum image, a fusion of FIR images having various focal lengths, and the like. Any number of input streams may be received and processed to produce the fused output stream.

The FIR sensor 120 is an uncooled FIR sensor. That is, the sensor 120 operates in the FIR spectrum with a wavelength of 7.0-14.0 μm. In an example, the FIR sensor 120 is coupled through a first bus 101 to the IC 130 to input the captured FIR images and metadata. In an embodiment, a junction temperature sensor (temp sensor) 121 is included in an enclosure of the FIR sensor 120 to measure the junction temperature therein.

A control bus 102 is also connected between the FIR sensor 120 and the IC 130. On the bus 102, signals related to status of the sensor 120, clock, synchronization, and other digital control signals are transferred. In an embodiment, the bus 102 may carry analog signals indicating, for example, the current ambient temperature at the FIR sensor 120. Alternatively, the analog signal may not be part of the control bus 102.

The IC 130 includes a memory, a processing circuitry, and various circuits and modules allowing the execution of the tasks noted herein. A detailed block diagram of the IC 130 is provided in FIG. 2. The IC 130 may be realized as a chipset, a system on a chip (SoC), a field programmable gate array (FPGA), a programmable logic device (PLD), an application specific integrated circuit (ASIC) or any other type of digital and/or analog hardware components.

The IC 130, and hence the FIR camera 100, operates in four different modes: calibration, a power-on-test, a function, and a standby. The calibration mode is performed at a lab where the IC 130 executes a calibration process based on the previous calibration points. During the process, the FIR camera 100 is stabilized at a predefined temperature and both the FPGA and ambient temperatures are periodically read from the FIR sensor 120 to determine temperature stability.

In the power-on-test mode, the FIR camera 100 is checked, during its power-up, if the various circuits of the IC 130 operate properly. This includes, for example, performing internal self-tests for memories, logic monitors, digital and analog components. In the functional mode, the IC 130 performs image processing tasks and communicates with external systems and components (e.g., sensor and computer). In the standby mode, no image processing is performed but only communication with the external systems and components. The standby mode may be activated when the vehicle is not in motion.

The FIR sensor 120 and IC 130 are encapsulated in a thermal core. The thermal core is utilized to ensure a uniform temperature for the FIR camera 100. The temperature calibration of the thermal core is performed during the calibration mode. The optical unit 110 is typically assembled in the FIR camera 100 after the FIR sensor 120 and IC 130 are encapsulated in the thermal core.

Figure 2:
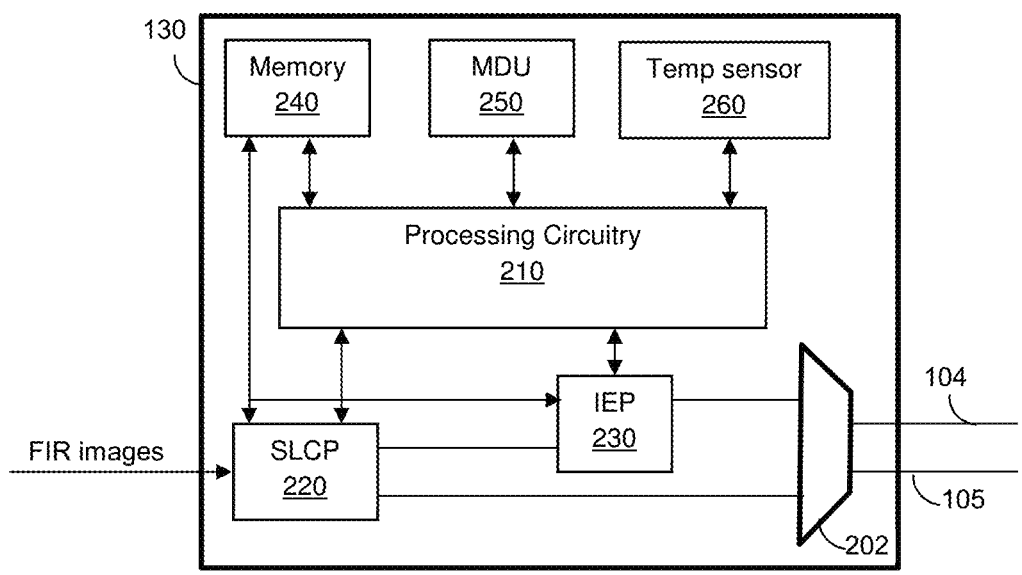
FIG. 2 is a block diagram of an integrated circuit (IC) integrated in the FIR camera of FIG. 1 according to an embodiment.

FIG. 2 show an example block diagram of the IC 130 designed according to one embodiment. The IC 130 includes a processing circuitry 210, a shutterless correction processor (SLCP) 220 and an image enhancing processor (IEP) 230 that are configured to execute the various image processing tasks discussed herein. The IC 130 further includes a memory 240, and a temperature sensor 260.

The IC 130 interfaces with the external elements, such as the computer 140 and display 150 through a multimedia link 202. In an example embodiment, the media link is a gigabit multimedia serial link (GMSL). As noted above, in one embodiment, the IC 130 can be configured to output two thermal video streams of FIR images: a first stream (104) is processed by the SLCP 220 and the IEP 230 and input to the display 140, and second stream (105) is processed by the SLCP 220 and input to the display 150. Both thermal video streams are output via the multimedia link 202. In a further embodiment, a single thermal video stream is output to the computer 150. For example, certain autonomous vehicle systems may not include a display, and thus only require input from the thermal video stream to a computer 150.

In some optional embodiments, the IC 130 does not include the IEP 230. In such embodiments, shutterless correction is performed by the SLCP 220, and the output is fed to the computer 140. A configuration of the FIR camera 100 without the IEP 130 can be utilized in autonomous vehicle systems where a display may not be required.

In an embodiment, the memory 240 is configured to store calibration tables. The calibration tables include at least various calibration values for each pixel computed at the lab. The calibration values may include the Gain and Offset calculated from two temperature points ($T_1$, $T_2$) for the purpose overcoming the irregularities in the FIR sensor and unifying the pixels' response to IR radiation for a wide range of ambient temperatures. The calibration table also includes a drift value determined for each pixel at each temperature point during a calibration process. In an embodiment, the tables also store various parameters' values to set the FIR camera 100.

The memory 240 may further store computer readable instructions to be executed by the processing circuitry 210, the SLCP 220 and the IEP 230. The computer readable instructions shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, the SLCP 220 and/or IEP 230, cause these processors to perform the various embodiments and tasks described herein. The memory 240 may be volatile (e.g., RAM, etc.), non-volatile (e.g., ROM, flash memory, etc.), or a combination thereof.

In an optional configuration, the camera IC 130 includes a motion detection unit (MDU) 250. The MDU 250 includes one or more accelerometers utilized to determine if the FIR camera 100 (and hence the vehicle) is in motion. When the MDU 250 is not utilized, a motion detection is based on the captured imaged. A motion indication is provided to the SLCP 220 and IEP 230. The temp sensor 260 measures the ambient temperature inside the enclosure of the FIR camera 100.

The processing circuitry 210 is configured to control the various elements of the IC 130. The circuitry 210 is further configured to power-up the FIR sensor 120, upload the initial calibration tables and set the FIR sensor 120 and the SLCP 220 and IEP 230 based on the parameters' values in such tables. In an embodiment, the circuitry 210 periodically samples the temperature as measured by the temp sensor 260, and uploads a set of calibration tables from the memory 240 that include calibration values for the measured temperature range. To allow for fast execution, some tables can be uploaded in the background, i.e., during the processing of FIR images.

In an embodiment, the SLCP 220 is configured to perform at least shutterless pixel-based and scene-based corrections. The pixel-based correction corrects offset, gain and drift for each pixel. In an embodiment, the offset and gain of a pixel are corrected based on the respective values in the calibration table matching a respective temperature as measured by the temp sensor 121 (FIG. 1). This correction compensates for the irregularities in the sensor and unify the pixels' response to IR radiation for a wide range of ambient temperatures. The drift correction includes adding drift correction to each of the pixels. Specifically, correction for each pixel is a subtraction of a product of pre-defined drift value provided from a loaded calibration table separately for each pixel and a gamma value which is calculated from the frames produced by the FIR sensor. The pre-defined drift value is selected from table based on the current measured temperature at the FIR sensor 121.

According to some embodiments, the drift correction is based on a temperature drift correction for each of the pixels in the images output the FIR sensor. This may be necessary if the temperature values of the FIR camera as a whole, and the FIR sensor and IC individually, shift during operation.

The drift correction may be based on estimating a drift coefficient γ using a drift pattern recorded during the calibration stage of the FIR camera 100. In an embodiment, estimation of the drift coefficient γ is performed iteratively with small incremental updates based on each input image, so that any residual noise or new noise, e.g., due to ambient temperature shifts, is detected and removed with each subsequent image.

The ambient drift of an input image is corrected using the estimated drift coefficient γ. A drift corrected image ($I_{out}$) can be represented as follows:

$$I_{out} = \frac{I_{in} - \gamma \cdot D - O}{G} \quad \text{Eq. 1}$$

where, is $I_{in}$ is the input image (produced by the FIR sensor 120); γ is the drift coefficient, which is the same for all pixels; 'D' is the drift pattern, unique per pixel; 'O' is an offset gain pattern; and 'G' is the scene gain pattern value, unique per pixel, where D, O and G values are determined during initial calibration of the FIR sensor 120.

In some configurations, the gain and offset are corrected prior to the drift correction, in which case such values are not required to estimate the drift coefficient γ. Thus, a more generalized version of the drift correction calculation uses a 2-points corrected input image ($I_{2pt}$), drift coefficient and the drift pattern from the calibration, and can be represented as the following equation:

$$I_{out} = I_{2pt} \cdot \gamma \cdot \hat{D} \quad \text{Eq. 2}$$

In Equation 2, $\hat{D}$ is the value of the drift pattern (D) divided by the gain pattern (G).

The drift coefficient γ used for the correction is derived from the drift pattern from the initial calibration and the resulting pattern of drift within an input image after a high pass filter has been applied thereto.

A generalized equation for the drift coefficient is the quotient of the product of the drift pattern and the input image pixel values after applying a high pass filter thereto, and the product of the drift pattern and the drift pattern after applying a high pass filter thereto, represented by the following equation:

$$\gamma = \frac{\langle H_1(D), H_2(I_{in}) \rangle}{\langle H_1(D), H_2(D) \rangle} \quad \text{Eq. 3}$$

where, $H_1$, $H_2$ are pre-processing operators designed to minimize correlation between clean image of the scene and the drift pattern. Without loss of generality, these operators may include high pass filtering and masking. An example of such operations, without loss of generality, can be $H_1$=identity map and $H_2$=a high-pass filter.

In Equation 3 (Eq. 3), γ is a scalar value obtained as a ratio of 2 inner products. Therefore, it is one value for all pixels at this stage. In an embodiment, the scalar value can be converted to a (slowly varying) value per pixel by using Eq. 3 on different segments of the image and interpolating results. An example for such embodiment is discussed below.

In an embodiment, the scene-based correction includes removing fixed noise patterns. Such a pattern resulted from a high frequency signal remaining in the processed FIR image after subtracting a low-pass smoothed image from the original image. In a shutterless implementation, the resulted scene is homogeneous which leads to edges (high-frequency signals) from the actual scene to appear in the obtained noise pattern. This may lead to real edges from the scene being mistakenly classified as noise. To this end, the noise patterns are determined based on image samples in time, and from homogeneous areas in space.

As will be discussed in detailed below, the SLCP 220 implements a plurality of modules to execute shutterless corrections and other image enhancing tasks. In an embodiment, the scene-based correction also includes correcting pixels that suffer from "sunburn effect." Such an effect is caused by exposing the FIR camera to direct sun which brings the exposed pixels into deep saturation due to overexposure. The outcome of this effect is characterized by a ghost footprint of sun similar to a fixed pattern noise which may last for minutes or weeks, depending on the exposure time. According to the disclosed embodiment, the sunburn correction also removes ghost footprints from the image in a few seconds (e.g., 2-5 seconds).

Figure 3:
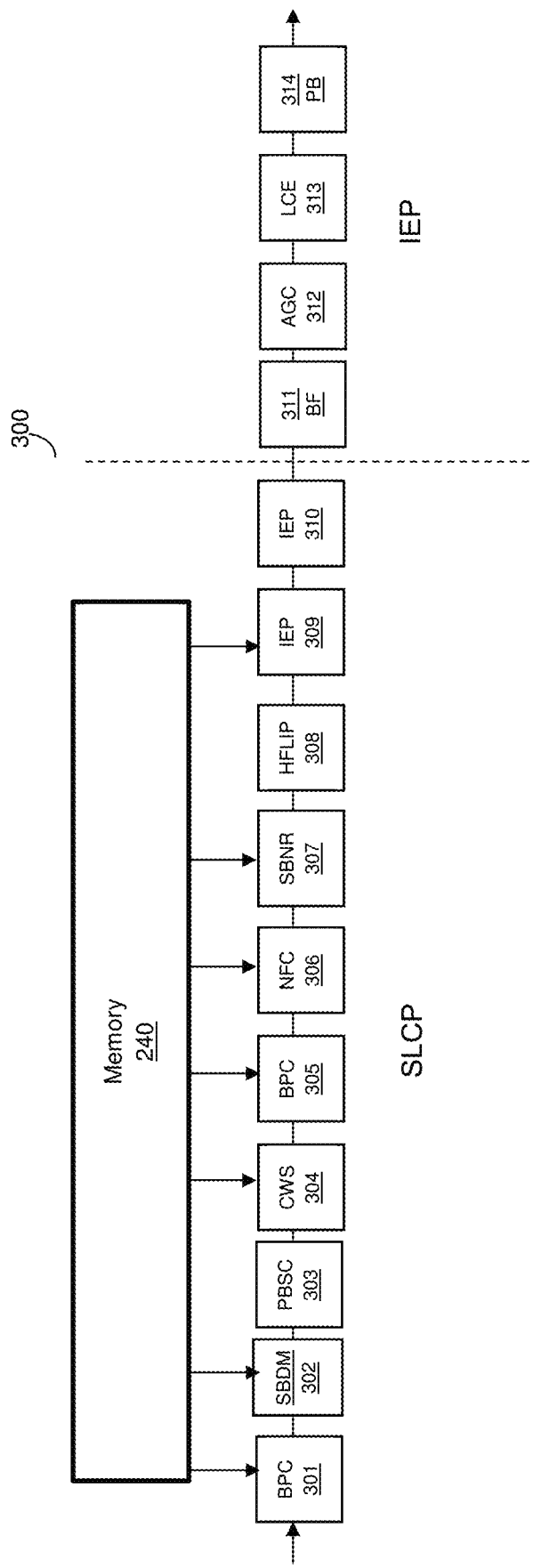
FIG. 3 illustrates a pipeline of processing tasks performed by the IC of FIG. 2 according to an embodiment.

At minimum, the SLCP 220 is implemented to perform pixel-based shutterless correction, column noise suppression, scene-based noise removal, and near field correction. In an embodiment, the SLCP 220 can be configured to perform additional image processing tasks to provide a high-quality thermal video stream that would allow for the accurate detection of objects. The image processing tasks are performed in a pipeline manner by the various modules as described as illustrated in FIG. 3.

The bad pixel correction (BPC) module 301 masks pixels designed in a bad pixel map. Such pixels do not meet the basic quality requirements as required by a manufacture of the FIR sensor. The bad pixels in the map can be identified by the manufacture or during a test performed on the FIR sensor at the lab. The bad pixel map is saved in the memory 240.

The sunburn detection module 302 detects pixels that suffer from sunburn, i.e., pixels that exposed to deep saturation. In an embodiment, the received image from an FIR sensor is analyzed by computing the captured resistive value associated with each pixel of the image and determining if the value of a pixel exceeds a predetermined sunburn threshold value (PSTV) during a predefined time period. The PSTV is a value that represents an oversaturation of a pixel that is likely to be a sunburn artifact caused by a bright light source, such as the sun or the high beams of a car. The determination can be made using the following equation:

$$Max > P > PSTV \qquad \text{Eq. 4}$$

where Max represents the maximum possible value for a pixel, P represents the current value of the pixel, and PSTV is the predetermined threshold value. If P falls between the PSTV and the Max value for a predefined time period, it is assigned a sunburn designation.

It is determined if the neighboring pixels of a current pixel exceed the PSTV. In a non-limiting example, an r by r pixel square around the pixel is analyzed (where r is an integer gather than 1). Even if the pixel itself is equal to or less than the PSTV, if any of the r by r neighboring pixels exceeds the PSTV and lower than the max value over a predetermined period of time, the current pixel is assigned a sunburn designation. This ensures that a single pixel positioned within a larger area that is determined to be an artifact caused by a sunburn is still treated as a sunburn pixel. This method is effective in identifying sunburn pixels, as sunburn artifacts appear as localized patterns with a high correlation with neighboring pixels. Thus, the value of a neighboring pixel, when measured over a sufficient time-period, may indicate the presence of a sunburn artifact. This is in contrast to other unwanted artifacts introduced into images, such as fixed pattern noise, which appears at random positioning within an image and has a low correlation with neighboring pixels.

In an embodiment, if P=Max, it is determined that the evaluated pixel is being currently exposed to a bright source of light. Because the bright light is determined to be present within the image, there is no need for instant correction, as the scene is being properly displayed. Rather, the pixel's value is tracked and when its value exceeds the PSTV for the predetermined period of time, the correction is triggered.

If none of the neighboring pixels are determined to exceed the PSTV for the predetermined period of time, the pixel is assigned a non-sunburn designation. The process continues until the entire image has been evaluated. It may be determined if there are additional pixels within the pixel matrix to be analyzed.

The pixel-based shutterless correction (PBSC) module 303 performs correction of the offset, gain and drift value for each pixel as discussed above. The column noise suppression (CNS) module 304 suppresses fixed pattern column noise in the FIR image capture by the FIR sensor. The bad pixel correction (BPC) module 305 attempts to correct bad pixels by approximating each bad pixel using an optimal interpolation based on the pixel predefined number (e.g., 8) of its closest neighboring pixels.

The near field correction (NFC) 306 corrects undesired patterns superimposed on the scene image by various physical effects such as reflections of the camera case and lens. Such patterns are modeled during the calibration mode. During the operational mode, the NFC module 306 identifies a best fit between the pattern and the input image and subtracts the pattern from the image accordingly. The NFC module 306 handle two such patterns either independently or as a linear combination. The required pattern images and parameters are provided by the processing circuitry 210 at power up and updated when necessary.

The scene-based noise removal (SBNR) module 307 performs the shutterless scene-based and sunburn correction tasks discussed above. The module 307 is required for a proper shutterless operation.

To perform the scene-based nonuniformity correction, the SLCP 220 is configured to detect smooth regions to learn or otherwise estimate the noise patterns, detect if the FIR camera (hence the vehicle) is in motion (since the noise estimation is performed during motion only), and detect regions that undergo changes, as some regions will not change from frame to frame even during motion. According to some disclosed embodiments, the residual nonuniformity estimate within an image at a specific time ($D_t$) can be represented as follows:

$$D = D_{t-1} + (1-\alpha) \cdot D_{curr} \qquad \text{Eq. 5}$$

where, is $D_t$ is the noise estimated at time t, $D_{t-1}$ is the noise previously estimated at time t−1, and $D_{curr}$ is the noise estimated from the currently captured image, and α is a learning rate having a scalar value from 0 to 1. At time t=0, the value is $D_t$ is 0. It should be noted that $D_t$, $D_{t-1}$, and $D_{curr}$, are matrices having the size 'm' by 'n', for an image containing 'm' by 'n' pixels. In an embodiment, the noise of each pixel within the image is calculated, and thus each pixel is assigned a noise value.

In an example embodiment, the value $D_{curr}$ can be represented as follows:

$$D_{curr} = HI_d \cdot M, \qquad \text{Eq. 6}$$

$$I_d = I - D_{t-1} \qquad \text{Eq. 7}$$

where $HI_d$ represents a high frequency representation of the image. $HI_d$ can be determined by applying high-pass filter on the diffidence image $I_d$ between current input image I and the estimated noise $D_{t-1}$ at a time t−1. In an embodiment, $I_h = HI_d$ is calculated by applying a high-pass filter on $I_d$. The computation of $I_d$ is performed for every pixel in the image. In an embodiment, bad and saturated pixels are excluded from the computation by including them in the mask M. Here, the matrix M represents a masking, namely pixels in the image that are designated to be included in the calculation of the residual nonuniformity present in the current image. In an example embodiment, the mask matrix M is based on a combination of four different masks. In such an embodiment, M can be represented as follows:

$$M = M_{sat} \cdot M_b \cdot M_{edge} \cdot M_t \qquad \text{Eq. 8}$$

where $M_{sat}$ is a mask without over-saturated pixels, $M_b$ is a mask with pixels that are deemed to be "bad pixels" excluded," $M_{edge}$ is a mask with edges excluded, and $M_t$ is a mask with regions lacking temporal changes excluded. All, of $M_{sat}$, $M_b$, $M_{edge}$, $M_t$ are matrices. In an embodiment, M is a binary mask with 1 denoting included pixels and 0 denoting excluded pixels.

$M_{sat}$ and $M_b$, representing oversaturated and 'bad' pixels that have been identified by analyzing the image, are removed from the image regions used to calculate the scene-based nonuniformity correction. 'Bad pixels' are pixels within the image that are known a-priori to be defective. These pixels are removed from the calculation by applying a mask $M_b$ on the image. In contrast, $M_{edge}$ and $M_t$ exclude "live" pixels that must be dropped because they either come from regions that have too strong edges, or are not dynamical enough.

The matrix $M_{edge}$ is calculated by comparing a pixel to neighboring pixels, for example creating a q×q (where q an integer greater than 1) matrix around the pixel, and determining if there is a significant gap in pixel value.

The matrix $M_t$ represents regions with changes between two images. For example, if a low contrast depiction of a distant mountain in a first image stays stationary relative to the second image, the corresponding pixels are masked to exclude them from the calculation, as they do not represent changes within the image. However, if a moving object within the foreground of the frame changes position between the first and the second image, those pixels are not masked, allowing for the calculation of noise from the changes within the image.

The h-flip module 308 implements horizontal flip of the received sensor image. In an embodiment, the module 308 is further configured to clip the pixels' values between minimum and maximum values. These values are pre-configured.

The time denoise module 309 is configured to perform time denoising process of infrared video. The video obtained from the FIR sensor contains temporal noise of varying types, such as white noise, salt and pepper noise (occasional flickering) and row/columns noise. In an embodiment, the module 309 is realized by an IIR filter with an adaptive threshold, and an anti-flickering mechanism. The time denoise module 309 compares changes in pixel values from frame to frame to the estimated noise variance, to decide whether such values are caused by noise, or by some actual change in the scenery. Based on the comparison, a signal to noise ratio is determined.

The spatial denoise module 310 is configured to denoise spatial noise. Such noise is caused due to internal electronic noise, errors in the pixel gains and offsets and drifts caused by temperature fluctuations. In an embodiment, the module 310 replaces each noisy pixel by weighted average of neighboring pixels. In an embodiment, only pixels having a gray level that is closer to a predefined gray level threshold are replaced.

It should be noted that in certain configurations only some of the modules described are required as part of the processing. The various parameters, maps, and calibration values are not required to operate the various modules and processes stored in the memory 240 and are not illustrated herein merely for the sake of simplicity.

In an example embodiment, the output of the spatial denoise module 310 is a 14-bit grayscale video stream fed to the computer 140 (FIG. 1) and the IEP 230.

Returning to FIG. 2, the IEP 230 processes the 14-bit stream to produce an enhanced thermal video stream that can be seen by a human. In an embodiment, the IEP 230 converts the 14-bit stream to a high quality 8-bit stream that can be efficiently displayed on a screen.

In an embodiment, the IEP 230 includes the modules, shown in FIG. 3, that perform image enhancement processes. The first module is a bilateral filter 311 utilized to edge preserving and noise reduction filter. The automatic gain control (AGC) module 312 is configured to reduce the influence of empty bins from the gray level range. That is, the module 312 reduces the distance between the lowest and the highest gray levels in the image to a minimum without essentially losing information. The dynamic range reduction allows to stretch the image histogram as much as possible.

The local contrast enhancement (LCE) module 313 performs a process for contrast limited adaptive histogram equalization (CLAHE). In image processing, contrast limited adaptive histogram equalization is a technique used to improve the local contrast of an image. The adaptive histogram equalization is performed to find the mapping for each pixel based on its local (neighborhood) grayscale distribution.

In an embodiment, the LCE module 313 is configured to divide the image into overlapping blocks to reduce even more the blocking effect. In some cases, when grayscale distribution is highly localized, it may not be desirable to transform very low-contrast images by full histogram equalization. In such cases, the mapping curve may include segments with high slopes, meaning that two very close grayscales might be mapped to significantly different grayscales. This is resolved by limiting the contrast that is allowed through histogram equalization.

The last image processing enhancement module is the polarity-and-brightness (PB) module 314. In an embodiment, the module 314 changes between white-hot and black-hot pixels and adjust the brightness of the image's pixels by a predefined offset.

It should be noted that the processing of the various modules shown in FIG. 3 is performed on infrared images input by the FIR sensors 120. The results images are still infrared images (referred herein as "FIR images"). Thus, the processing does not change the nature of the image (e.g., from an infrared to a visible spectrum image), but rather improves the quality of the infrared image.

Referring again to FIG. 2, in an embodiment, the processing circuitry 210 can be a single core or a multiple-core CPU. Each of the SLCP 220 and IEP 230 may be realized as one or more hardware logic components and circuits. For example, and without limitation, illustrative types of hardware logic components that can be used include a FPGA, an ASIC, an ASSP, a SOCs, a general-purpose microprocessor, a microcontroller, a DSP, a GPU, and the like, or any other hardware logic components that can perform calculations or other manipulations of information.

Figure 4A:
FIGS. 4A and 4B are thermal images output by the FIR camera of FIG. 1.

As noted above, the output thermal video stream can be processed and analyzed to detect objects, obstacles and hazards in a scene. Following are some examples:

FIG. 4A shows an example thermal image 400 captured at night, output by the FIR camera 100 installed on a car (not show). The analysis of the image 410 allows for the detection of an animal (410) crossing the road.

Figure 4B:
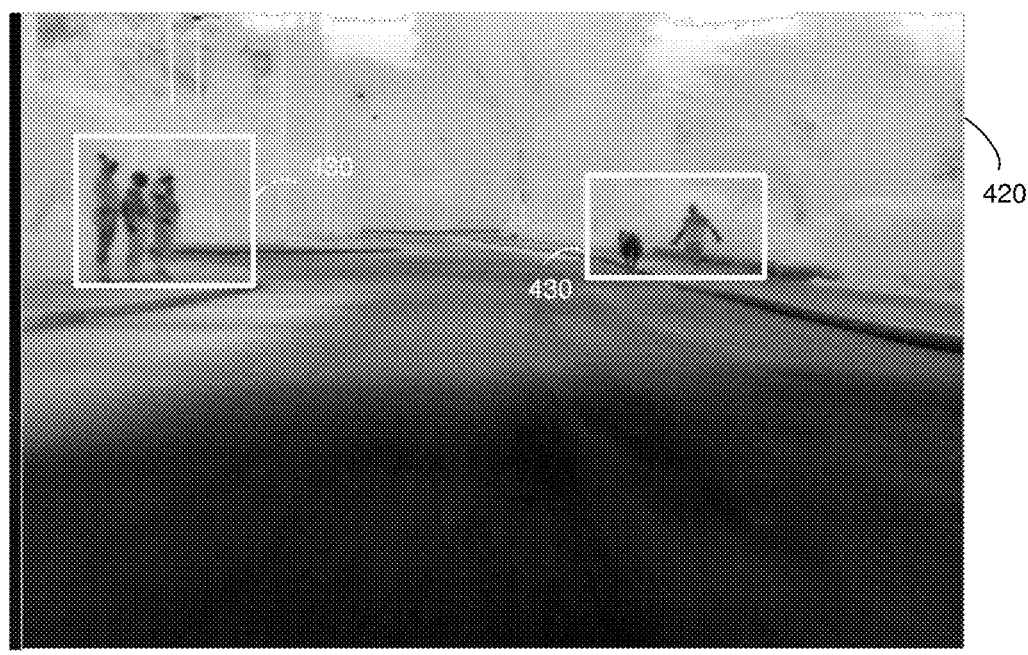

FIG. 4B shows an example thermal image 420 captured on a rainy night, output by the FIR camera 100 installed on a car (not show). The analysis of the FIR images allows the detection of pedestrians (430) walking on the road.

FIG. 5 shows an example embodiment of the shutterless FIR camera 100. In an embodiment, the shutterless FIR camera 100 is shaped a cylinder having a size comparable to a 'C' size battery. In an example embodiment, the diameter of the camera is 25.4 mm and the length of the camera without the lens is 12 mm. The small size form factor of the FIR camera 100 allows for installation of the camera on various inconspicuous locations on a vehicle that would not change the overall appearance of the vehicle.

Figure 6:
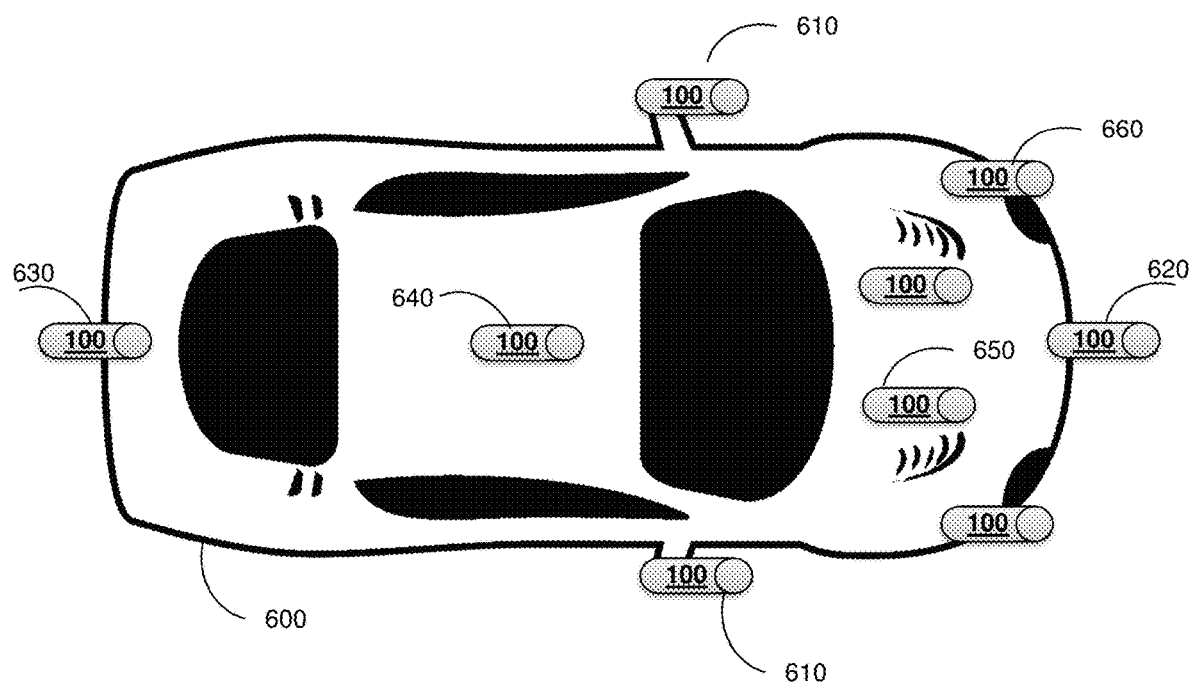
FIG. 6 is a schematic diagram indicating various locations for mounting an FIR camera on a car.

FIG. 6 is a schematic diagram indicating various locations for mounting an FIR camera on a car. In an example embodiment, the shutterless FIR camera 100 can be mounted to either or both of the side mirrors 610 of a vehicle 600, a grill guard (not shown), a front bumper 620, a back bumper 630, the top of the car 640, the hood 650, headlights 660, and antenna (e.g., a radio satellite antenna, not shown). Other locations that provide unblocked field of views are also applicable.

In an embodiment, multiple shutterless FIR cameras 100 can be installed or mounted on a single vehicle. In such a configuration, the wide field of view of the multiple cameras are responsible of crossing objects detection and scene understanding while the narrow field of view camera handles far range objects (or obstacles).

In yet another embodiment, the vehicle may be equipped with other passive or active detection means, such as CMOS cameras, LIDAR and RADAR. In such configurations, detection of objects, obstacles or hazards may be performed based on data captured by such detection means and FIR images captured and processed by the disclosed shutterless FIR cameras 100.

It should be noted that the disclosed shutterless FIR camera can be disclosed on any type of vehicle. For example, the disclosed FIR camera can be mounted, installed or integrated in cars, buses, motorcycles, tracks, trains, drones, unmanned aerial vehicles, airplanes, air balloons, armored vehicles, agricultural machines, tanks, and so on. The vehicle may be an autonomous vehicle or operated by an operator (e.g., a driver).

Some embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A shutterless far-infrared (FIR) camera for advanced driver assistance systems, comprising:
    at least one optical unit including at least one lens;
    an FIR sensor coupled to the optical unit and configured to capture FIR images; and
    an integrated circuit (IC) configured to process the captured FIR images to output an enhanced thermal video stream, wherein the IC further comprises:
    a processing circuitry; and
    a memory containing instructions that, when executed by the processing circuitry, configure the processing circuitry to:
    perform image corrections including at least a shutterless correction, wherein the shutterless correction includes:
        retrieving predetermined calibration tables that include pre-defined drift values for each pixel within an FIR image based on a current FIR sensor temperature;
        determining a drift correction based on the pre-defined drift values and a gamma value of a current FIR image, wherein the gamma value is a quotient of a first inner product of a drift pattern and a plurality of input image pixel values after applying an identity map on the drift pattern and a high pass filter on the plurality of input image pixel values, and a second innerproduct of the drift pattern after applying the identity map on the drift pattern and the high pass filter on the drift pattern; and
        applying a shutterless pixel-based correction to the FIR images based on the predetermined calibration tables, wherein the shutterless pixel-based correction includes applying the drift correction.

2. The shutterless FIR camera of claim 1, wherein the IC is further configured to output a first output thermal video stream to a computer.

3. The shutterless FIR camera of claim 2, wherein the IC is further configured to output a second output thermal video stream to a display.

4. The shutterless FIR camera of claim 1, wherein the FIR camera further comprises:
    a plurality of image sensors coupled to the IC.

5. The shutterless FIR camera of claim 4, wherein at least one of the plurality of image sensors is an FIR sensor.

6. The shutterless FIR camera of claim 4, wherein the IC is further configured to output a thermal video stream that is an image fusion of the plurality of image sensors.

7. The shutterless FIR camera of claim 1, wherein the FIR sensor and the IC are encapsulated within a thermal core.

8. The shutterless FIR camera of claim 1, wherein the IC is further configured to:
    apply a shutterless scene-based noise correction to the FIR images.

9. The shutterless FIR camera of claim 1, wherein the calibration tables include at least a gain and an offset value calculated based on two temperature points for overcoming gain and offset irregularities in the FIR sensor and unifying the FIR sensor's response to infrared (IR) radiation for a range of ambient temperatures.

10. The shutterless FIR camera of claim 9, wherein the IC is further configured to:
    retrieve a subset of calibration values from the calibration tables, wherein the subset of calibration values is of a specific temperature range determined based on a current measured temperature.

11. The shutterless FIR camera of claim 8, wherein the calibration tables include a drift value determined for each pixel at each temperature point during a calibration process of the FIR sensor.

12. The shutterless FIR camera of claim 1, further comprising:
an image enhancing processor (IEP);
wherein the IEP is further configured to apply correction processes on the captured FIR images, wherein the correction processes are applied in a pipe-line fashion.

13. The shutterless FIR camera of claim 12, wherein a correction process of the correction processes includes: using a bilateral filter to preserve edges to reduce noise within the captured FIR images.

14. The shutterless FIR camera of claim 12, wherein a correction process of the correction processes includes: applying an automatic gain to reduce a distance between a lowest and a highest gray level within the FIR images, thereby stretching an image histogram of the FIR images.

15. The shutterless FIR camera of claim 12, wherein a correction process of the correction processes includes: applying a contrast limited adaptive histogram equalization (CLAHE) by dividing the FIR images into overlapping blocks and applying a histogram equalization within each individual block.

16. The shutterless FIR camera of claim 10, wherein a correction process of the correction processes includes: a polarity-and-brightness module configured to perform at least one of: changing white-hot pixels for black-hot pixels and adjusting the brightness of the FIR images by a predefined offset.

17. The shutterless FIR camera of claim 1, wherein the enhanced thermal video stream is configured to detect objects in advanced driver assistance systems.

18. The shutterless FIR camera of claim 17, wherein the objects include at least one of: vehicles, pedestrians, animals, two-wheelers, black-ice spots, litter, debris, potholes, gully covers, and curbs.

19. The shutterless FIR camera of claim of claim 1, wherein the advanced driver assistance systems include autonomous vehicles systems.

20. An electronic circuit integrated in a shutterless far-infrared (FIR) camera and configured to process FIR images, comprising:
a processing circuitry; and
a memory containing instructions that, when executed by the processing circuitry, configure the processing circuitry to:
perform image corrections, including at least a shutterless correction on the FIR images to output an enhanced thermal video stream, wherein the shutterless correction includes;
retrieving predetermined calibration tables that include pre-defined drift values for each pixel within an FIR image based on a current FIR sensor temperature;
determining a drift correction based on the pre-defined drift values and a gamma value of a current FIR image, wherein the gamma value is a quotient of a first inner product of a drift pattern and a plurality of input image pixel values after applying an identity map on the drift pattern and a high pass filter on the plurality of input image pixel values, and a second inner product of the drift pattern after applying the identity map on the drift pattern and the high pass filter on the drift pattern; and
applying a shutterless pixel-based correction to the FIR images based on the predetermined calibration tables, wherein the shutterless pixel-based correction includes applying the drift correction.

21. The electronic circuit of claim 20, wherein the electronic circuit and an FIR camera are integrated in advanced driver assistance systems.

22. The electronic circuit of claim 20, wherein the processing circuitry is further configured to:
apply a shutterless scene-based noise correction to the FIR images.

23. The electronic circuit of claim 20, wherein the calibration tables include at least a gain and an offset value calculated based on two temperature points for overcoming gain and offset irregularities in an FIR sensor and unifying the FIR sensor's response to infrared (IR) radiation for a range of ambient temperatures.

24. The electronic circuit of claim 23, wherein the processing circuitry is further configured to:
retrieve a subset of calibration value from the calibration tables, wherein the subset of calibration values is of a specific temperature range determined based on a current measured temperature.

25. The electronic circuit of claim 22, wherein the calibration tables include a drift value determined for each pixel at each temperature point during a calibration process of an FIR sensor.

26. The electronic circuit of claim 20, further comprising:
an image enhancing processor (IEP);
wherein the IEP is further configured to apply correction processes on the captured FIR images, wherein the correction processes are captured in a pipe-line fashion.

27. The electronic circuit of claim 26, wherein a correction process of the correction processes includes: using a bilateral filter to preserve edges to reduce noise within the captured FIR images.

28. The electronic circuit of claim 26, wherein a correction process of the correction processes includes: applying an automatic gain to reduce a distance between a lowest and a highest gray level within the FIR images, thereby stretching an image histogram of the FIR images.

29. The electronic circuit of claim 26, wherein a correction process of the correction processes includes: applying a contrast limited adaptive histogram equalization (CLAHE) by dividing the FIR images into overlapping blocks and applying a histogram equalization within each individual block.

30. The electronic circuit of claim 26, wherein a correction process of the correction processes includes: a polarity-and-brightness module configured to perform at least one of: changing white-hot pixels for black-hot pixels and adjusting the brightness of the FIR images by a predefined offset.

* * * * *